(12) United States Patent
Raghavan et al.

(10) Patent No.: US 11,416,265 B2
(45) Date of Patent: Aug. 16, 2022

(54) PERFORMANCE TUNING A DATA STORAGE SYSTEM BASED ON QUANTIFIED SCALABILITY

(71) Applicant: EMC IP Holding Company LLC, Hopkinton, MA (US)

(72) Inventors: Rasa Raghavan, Verona, WI (US); Steven A. Morley, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 16/743,352

(22) Filed: Jan. 15, 2020

(65) Prior Publication Data

US 2021/0216330 A1 Jul. 15, 2021

(51) Int. Cl.
*G06F 9/445* (2018.01)
*G06F 11/34* (2006.01)

(52) U.S. Cl.
CPC ...... *G06F 9/44505* (2013.01); *G06F 11/3409* (2013.01)

(58) Field of Classification Search
CPC .................. G06F 9/44505; G06F 11/3409
See application file for complete search history.

(56) References Cited

U.S. PATENT DOCUMENTS

| 7,401,333 | B2 | 7/2008 | Vandeweerd |
| 9,465,632 | B2 | 10/2016 | Ebcioglu et al. |
| 2016/0328273 | A1* | 11/2016 | Molka ............ G06F 9/505 |
| 2017/0269913 | A1 | 9/2017 | Meijer et al. |

* cited by examiner

*Primary Examiner* — Kim Huynh
*Assistant Examiner* — Eric Chang
(74) *Attorney, Agent, or Firm* — BainwoodHuang

(57) ABSTRACT

A method of tuning performance of a data storage system includes calculating an estimate of parallel fraction and speedup characteristic for a data storage application executed by the data storage system. The estimate is calculated using linear regression of values $(1/N, 1/X_N)$ that are generated from trial runs of the data storage application processing a workload using respective different numbers N of CPU cores to obtain corresponding performance values $X_N$. The method further includes configuring the data storage system to execute the data storage application using a number of CPU cores based on the estimate of parallel fraction and speedup characteristic.

21 Claims, 3 Drawing Sheets

PERFORMANCE TUNING A DATA STORAGE SYSTEM BASED ON QUANTIFIED SCALABILITY

BACKGROUND

The present description is related to the field of performance tuning of data storage systems.

SUMMARY

A disclosed method of tuning performance of a data storage system includes calculating an estimate of parallel fraction and speedup characteristic for a data storage application executed by the data storage system. The estimate is calculated using linear regression of values (1/N, $1/X_N$) that are generated from trial runs of the data storage application processing a workload using respective different numbers N of CPU cores to obtain corresponding performance values $X_N$. The method further includes configuring the data storage system to execute the data storage application using a number of CPU cores based on the estimate of parallel fraction and speedup characteristic.

Advantages of the disclosed method include the use of an accurate linear estimation, which in general requires only a few data points; it is unnecessary to measure performance for every possible number of cores that may be used.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Resource scaling is a serious challenge facing software developers. Modern CPU designers often increase performance by placing more and more cores onto the same die. However, this does not automatically improve performance since multiple cores will be useful only if system code is designed to be scalable. While there is an art to developing systems to be maximally scalable, another aspect that confronts system architects and developers is to be able to quantify performance enhancement achievable from scaling in practice. Such quantification can provide an objective basis for exploring cost-performance tradeoffs as well as opportunities for fine tuning performance. Thus an approach is described herein for quantifying system scalability based on system performance measurements and linear regression. The results provide quantitative measures for tracking progress in system performance tuning as well as other purposes, such as system performance modeling for example.

DESCRIPTION OF EMBODIMENTS

Figure 1:
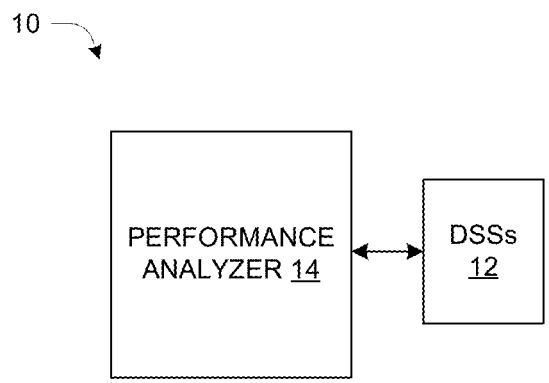
FIG. 1 is a block diagram of a computer system.

FIG. 1 is a block diagram of a system 10 that includes one or more data storage systems (DSSs) 12 and a performance analyzer 14. In operation, a DSS 12 provides secondary data storage services to separate computers (e.g., server computers, not shown) as clients. The performance analyzer 14 is a specialized computerized system that provides performance-related analysis of operation a DSS 12 and generates analysis results used in configuring the DSSs 12 for tuned performance, as described more below.

As a computerized system, the performance analyzer 14 has computer hardware including one or more processors, memory, and data interconnections such as one or more high-speed data buses (not specifically shown), and in operation the memory stores data and instructions of a performance analysis program which are executed by the processor(s) to cause the hardware to function in a software-defined manner. The performance application analysis program may be stored on non-transitory computer-readable medium such as an optical or magnetic disk, Flash memory or other non-volatile semiconductor memory, etc., from which it is retrieved for execution by the processing circuitry, as generally known in the art.

In the illustrated arrangement, the performance analyzer 14 is separate from the DSSs 12, and in this case may be embodied in a standalone computer (e.g., desktop or server) having communications connections to the DSSs 12. In some embodiments, a performance analyzer may be incorporated into a DSS 12, typically sharing computer hardware and using internal communication mechanisms. Also, while FIG. 1 suggests a real-time connection between the performance analyzer 14 and DSSs 12, such as a network conveying communications between these components as their operations occur concurrently, in fact the connection may have a temporal component as well, such that a performance analysis occurs at a first time T1 while related operation of a DSS 12 occurs at a different time T2. Thus in one case a performance analysis can occur as early as during a product design phase, for example, while the analysis results are used for an eventual configuring of a DSS 12 in a later production or deployment phase. Other operation scenarios are also contemplated.

Figure 2:
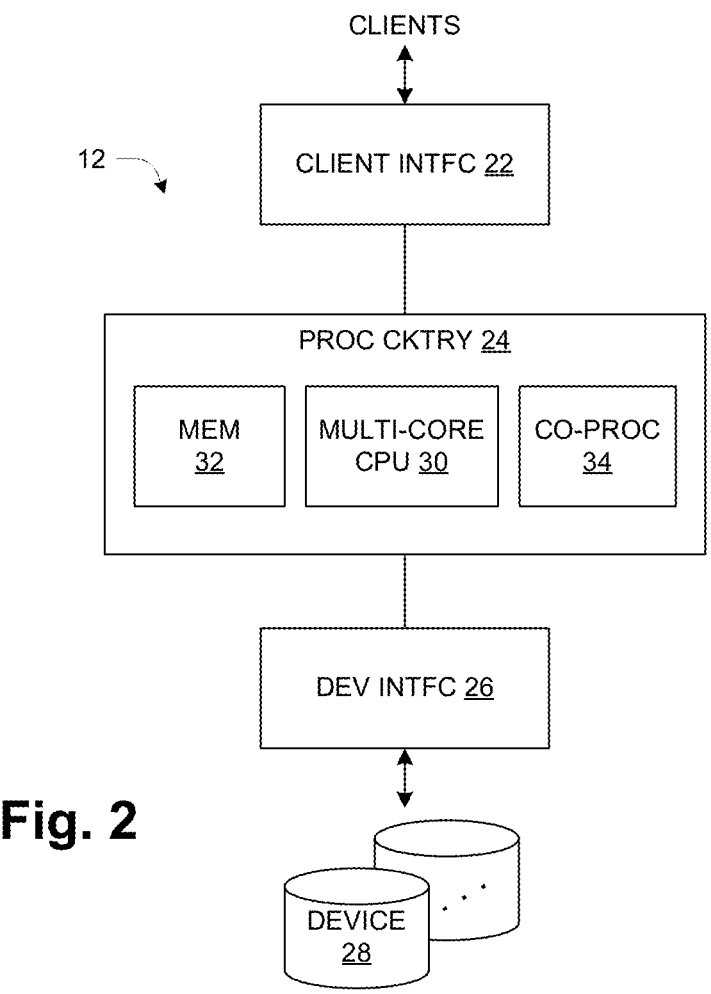
FIG. 2 is a block diagram of a data storage system.

FIG. 2 shows an example data storage system 12 including client interface (INTFC) circuitry 22, processing circuitry (PROC CKTRY) 24, device interface (DEV INTFC) circuitry 26, and data storage devices (DEVICE) 28. The client interface circuitry 22 provides an interface to a data network such as a storage area network (SAN), TCP/IP network, etc., with the clients storing data and accessing stored data by issuing corresponding storage write and read requests over the network to the data storage system 12. In one embodiment the data storage system 12 is realized as a so-called network-attached storage or NAS device, supporting one or more network file system protocols. In other embodiments the data storage system 12 may provide storage as logical or virtualized devices or volumes, using a storage-oriented protocol such as FibreChannel or iSCSI. In operation, storage requests are received by the client interface circuitry 22 and satisfied by operation of the remaining components.

As shown, the processing circuitry 24 includes a multi-core CPU 30, memory 32 and a co-processor 34, such as a data compression engine for example. The CPU 30 executes instructions of a data storage application (not shown), which are stored in and retrieved from memory 32 during execution after being retrieved from separate non-volatile storage such as disk or Flash. As generally known, the data storage application is responsible for myriad functional aspects of operation, including the management of resources and coordination of concurrent activities (i.e., handling multiple client I/O requests and back-end accesses concurrently), managing of internal file systems and other specialized data/functions providing a logical view of stored data to the clients, handling error conditions, etc.

The disclosed technique is specifically directed to the use of the multi-core CPU 30 by the data storage application. As generally known, a multi-core CPU includes a number of distinct processing elements, called "cores", which are connected for shared access to the memory 32 and are treated as allocable resources by resource-management code of the data storage application. A typical modern CPU may have on the order of 20 or more cores, for example. Use of independent cores can increase performance by parallel execution of distinct operations. For a data storage system in particular, parallelization may be based on one or more of the following as examples: (1) separating I/O requests of different clients and/or different devices 28, (2) separating I/O requests by stage of completion, e.g., front-end, cache, back-end, (3) separating operations by coarse function, e.g., dedicating some cores to certain background processes (such as rebuilds or cache management) while using other cores for handling client I/O.

In the remaining description, the data storage application is described in terms of its ability to be "parallelized", i.e., to have parts of it be executed in parallel. This feature is also referred to as "parallelizability" and represented via a parameter called "parallel fraction". Although no specific code examples are given, those skilled in the art will understand that parallelizability depends on both the general nature of the data storage application (e.g., general independence of operations) as well as its implementation (e.g., use of shared structures), and thus in general an application can be adjusted by suitable modification of code to reduce serial dependencies. For any given instance of an actual data storage application, specific features of the code contribute to its parallelizability and parallel fraction. The description below refers to parallel fraction as an abstract parameter that can be derived from measurements and analysis. It will be understood that in a real system the parallel fraction as measured arises from, and in a sense represents, the nature of the application as well as its detailed implementation. Some applications are inherently more parallelizable than others, and some implementations of a given application are move parallelizable than others.

Measuring System Scalability

Figure 3:
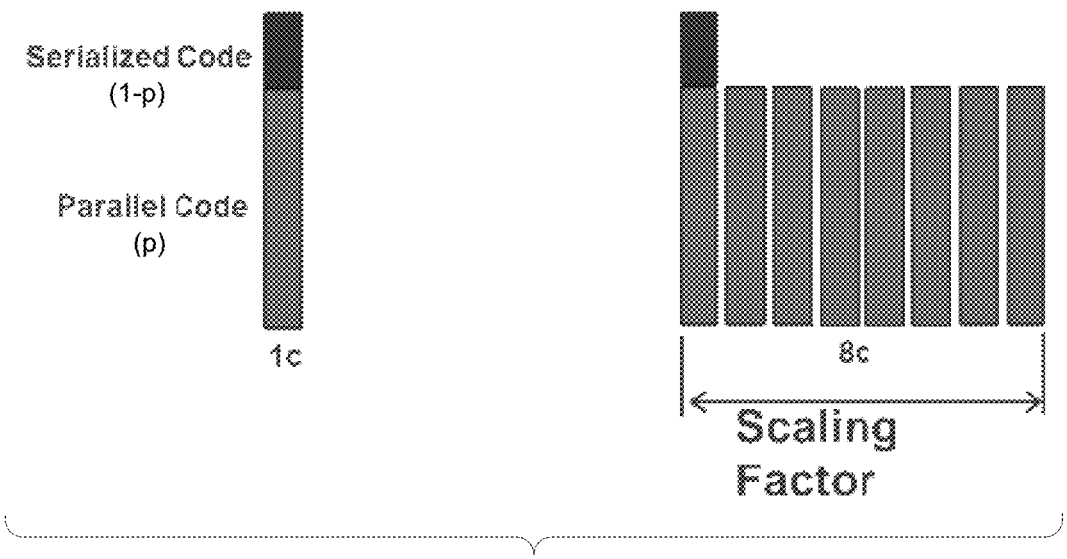
FIG. 3 is a schematic depiction of the scaling of application execution having a given amount of serial code.

FIG. 3 illustrates a key aspect of scalability or parallelization as discussed herein. Generally, parallelization of computer code across multiple CPUs (or cores) allows a system to accomplish more work in a given time period or complete a given task faster. However, practical limits on scaling can arise due to the nature of the code. At two logical extremes, code may be strictly serial (always requiring completion of one task before beginning another) or infinitely parallelizable (no interdependence among tasks). Real-world applications fall somewhere in between. FIG. 3 is an abstract illustration of the general case, in which an application has a fraction p of parallel code and a remaining fraction (1-p) of serial code. FIG. 3 illustrates the amount of work that can be accomplished with eight CPU cores (right side) compared to one CPU core (left side). Inevitably system code has a portion that is inherently sequential (or unscalable) and a portion that is parallelizable (or scalable.) The larger the parallelizable portion of the code (parallel fraction), the higher the system performance speedup.

System speedup due to scaling of computational resources can be estimated by analysis as follows. Suppose the amount of time to complete a task on a single core is T, and that a parallelizable part of the task (parallel fraction) is p; i.e., it will take pT/N amount of time to complete that part of the task on N cores. The rest of the task is not parallelizable, and it will take (1-p)T amount of time independent of the number of cores involved. The time to complete a task with N cores is the sum of the two:

$$p\frac{T}{N} + (1-p)T. \quad (1)$$

The speedup for N cores, S(N), is the ratio of time to complete a task on one core to time to complete a task on N cores:

$$S(N) = \frac{T(1)}{T(N)} = \frac{T(1)}{\frac{pT(1)}{N} + (1-p)T(1)} = \frac{1}{\frac{p}{N} + (1-p)} = \frac{N}{p + (1-p)N}. \quad (2)$$

Equation (2) is known as Amdahl's Law.

Figure 4:
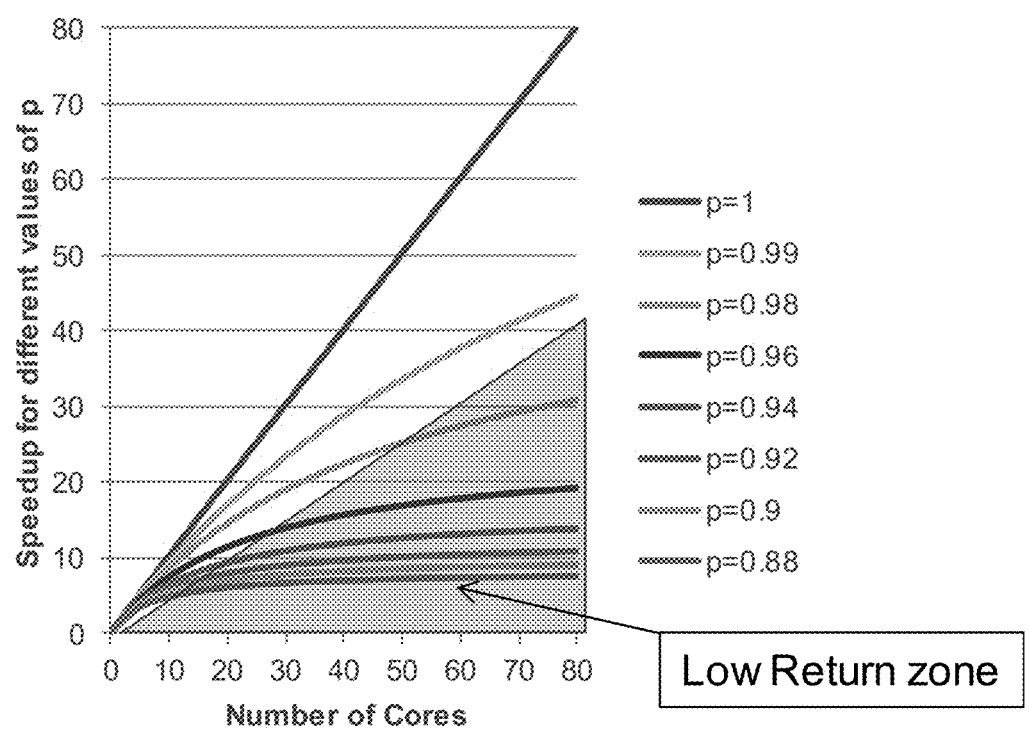
FIG. 4 is a plot of scalability characteristics (speedup versus N) for different values of a parallel fraction p.

FIG. 4 and Table 1 below show characteristics of system speedup for various parallel fractions p. As seen in FIG. 4, the speedup curve for each value of p extends toward a respective asymptote value of 1/(1-p), and thus the speedup characteristic for the application is very sensitive to the value of p. Overlaid in FIG. 4 is an example "low return zone" in which the speedup is less than one-half the number of cores, representing one definition of efficient parallelization (others may of course be used). Using this criteria, Table 1 below shows the critical number (N*) of cores to deliver at least half of the perfect-parallelizability (p=1) speedup for a given parallel fraction (p). Adding extra cores beyond the critical number gives only diminishing returns.

TABLE 1

| p | 0.80 | 0.82 | 0.84 | 0.86 | 0.88 | 0.90 | 0.92 | 0.94 | 0.96 | 0.98 | 0.99 |
|---|---|---|---|---|---|---|---|---|---|---|---|
| N* | 6 | 7 | 7 | 8 | 9 | 11 | 13 | 18 | 26 | 51 | 101 |

With the above appreciation of the relationship between speedup and the parallel fraction p, the description now turns to a technique for quantifying these values for a real system and using the results for desired purposes, such as performance tuning, code or hardware design, long-term performance analysis and tracking, etc.

The disclosed approach assumes that Amdahl's law applies to the system performance:

$$X_N = \frac{N}{p + (1-p)N} X_1, \quad (3)$$

where N is the number of CPU cores and X is a relevant performance metric. The present description uses system throughput in Input/Output operations per second (IOPS) as the performance metric X; in general, other metrics may be used. Thus the term $X_N$ in equation 3 is the system throughput in IOPS (or other metric) using N processing core, and the term $X_1$ refers to system throughput (or other metric) using only one core, also called "single-core IOPS". p is the parallel fraction, which represents the parallelizable portion of the code, and $$\frac{N}{p + (1-p)N}$$

is Amdahl's speedup for N cores. Equation (3) is used to derive the parallel fraction p and single-core IOPS $X_1$ given a set of system measurements (N, $X_N$) for various values of N.

First, equation 3 is inverted to obtain the following:

$$\frac{1}{X_N} = \frac{p + (1-p)N}{NX_1} = \left(\frac{p}{X_1}\right)\frac{1}{N} + \frac{1-p}{X_1}. \quad (4)$$

Equation (4) represents a line of the form y=mx+b, where $$y = \frac{1}{X_N}, x = \frac{1}{N},$$

slope $$m = \left(\frac{p}{X_1}\right)$$

and intercept $$b = \frac{1-p}{X_1}.$$

In other words, if the set of values (N, $X_N$) obeys Amdahl's law, then the set of values $$\left(\frac{1}{N}, \frac{1}{X_N}\right)$$

falls on a line with a slope $$m = \left(\frac{p}{X_1}\right)$$

and intercept $$b = \frac{1-p}{X_1}:$$

$$\frac{1}{X_N} = m\frac{1}{N} + b. \quad (5)$$

Thus the disclosed technique is based on obtaining sets of measurements of $X_N$ for a set of trials using different values of N, and estimating a linear fit of the values $$\left(\frac{1}{N}, \frac{1}{X_N}\right)$$

that are derived from the measured data. The slope m and intercept b of the estimated linear fit are used in further calculations to derive parallel fraction and other parameters. Generally, at least two data points are need to define a line, but three or more points generally provide better accuracy and indication of "goodness of fit" ($R^2$). The closer $R^2$ is to 1, the higher confidence level in the estimates.

Once the slope m and the intercept b are determined, those values are used to find the parallel fraction p and the single-core IOPS $X_1$, using the equations for slope and intercept as noted above:

$$\begin{cases} m = \frac{p}{X_1} \\ b = \frac{1-p}{X_1} \end{cases}. \quad (6)$$

Adding the two equations eliminates p:

$$m + b = \frac{p}{X_1} + \frac{1}{X_1} - \frac{p}{X_1}, \quad (7)$$

to express single-core IOPS as:

$$X_1 = \frac{1}{m+b}. \quad (8)$$

Substituting the solution for $X_1$ into the Equation (6), an expression for p is obtained:

$$p = mX_1 = \frac{m}{m+b}.$$

Single core IOPS ($X_1$) can then be used to estimate cycles per byte (CPB):

$$CPB = \frac{\langle \text{core clock frequency in Hz} \rangle}{\langle \text{Single core } IOPS \rangle \langle IO \text{ size in bytes} \rangle}. \quad (10)$$

Example

Data was collected on a data storage system having two storage processor boards (Node A and Node B) sharing a disk infrastructure. Each board has two 20-core CPUs (40 cores total) each running at 2.4 GHz core clock frequency. The scaling domain is constrained within each processor board. The workload is a series of 8 KB writes with cache misses (CM):

| 8 KB, Write, Cache Miss | Node A Core Count | Measured Node A IOPS | Node A CPU Utilization % | IOPS @100% Utilization |
|---|---|---|---|---|
| 16TA_5MB_ran_32Thrd_OR-1W-8KB | 5 | 18,449 | 75.26 | 24514.60 |
| 16TA_5MB_ran_32Thrd_OR-1W-8KB | 10 | 37,326 | 75.21 | 49629.13 |
| 16TA_5MB_ran_32Thrd_OR-1W-8KB | 18 | 67,117 | 79.61 | 84303.00 |
| 16TA_5MB_ran_32Thrd_OR-1W-8KB | 22 | 79,668 | 83.91 | 94943.57 |
| 16TA_5MB_ran_32Thrd_OR-1W-8KB | 28 | 97,036 | 87.73 | 110601.26 |
| 16TA_5MB_ran_32Thrd_OR-1W-8KB | 34 | 102,810 | 80.82 | 127213.35 |

The fraction of time that the CPU cores are not idle (the ratio of time that the CPU is busy over total time) is referred to as CPU utilization. Ideally, in the absence of other performance bottlenecks in the system, the CPU cores would never be idle, and CPU utilization would be close to 100%. Therefore, measured IOPS are normalized to 100% CPU utilization to eliminate the variability of measured IOPS with respect to CPU utilization:

$$\langle IOPS @ 100\% \text{ Utilization}\rangle = \frac{\langle\text{Measured Node A } IOPS\rangle * 100}{\langle\text{Node A } CPU \text{ Utilization \%}\rangle} \quad (11)$$

The data in the second column, <Node A Core Count>, and the last column, <IOPS at 100% Utilization>, are used to create a set of (1/n, 1/IOPS) values:

| 1/n | 1/IOPS |
|---|---|
| 0.200 | 4.08E−05 |
| 0.100 | 2.01E−05 |
| 0.056 | 1.19E−05 |
| 0.045 | 1.05E−05 |
| 0.036 | 9.04E−06 |
| 0.029 | 7.87E−06 |

Figure 5:
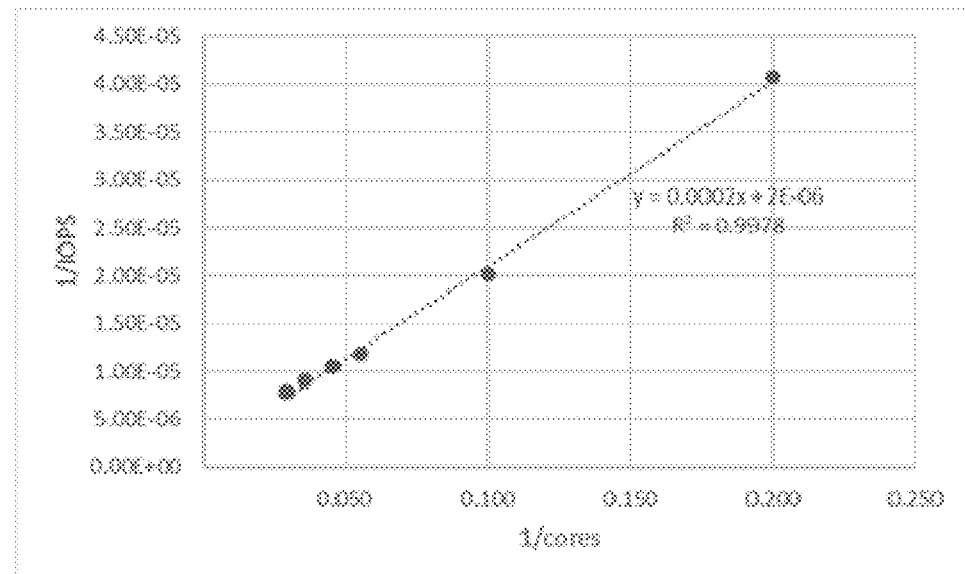
FIG. 5 is a plot of example data values and corresponding linear fit as used in scalability analysis.

FIG. 5 is a plot of the above data, as well as a linear fit obtained by linear regression calculations. For the sake of simplicity, only rounded values of the slope and intercept are given. However, as noted earlier, system performance is very sensitive to the calculated parallel fraction p, and therefore it is generally advisable to calculate the slope and intercept to the highest precision possible. In the trendline of FIG. 5, the values of the slope and intercept accurate to 6 significant digits are as follows:

| All 6 Data Points (Both Sockets) | m (slope) | b (intercept) |
|---|---|---|
| Linear Function | 0.000193449 | 1.67747E−06 |

Using the above values of m and b in the earlier formulas, the following derived values are obtained:

| | |
|---|---|
| Single Core IOPS | 5,124.89 |
| Parallel fraction - 8 KB CM Writes | 0.991 |
| CPB w/2.4 GHz core frequency | 57.17 |

The $R^2$ value for the regression is 0.9978, which indicates high confidence level that the linear approximation matches measured data as seen in FIG. 3.

As a system performance modeling example, the derived values of parallel fraction and single-core cycles per byte can be used to predict system throughput with 5 GHz, 100 core CPU. Assuming that there are no other bottlenecks in the system and using Equations (3) and (10), the following expression is derived:

$$X_N = \frac{N}{p + (1-p)N}X_1 = \frac{N}{p + (1-p)N}\frac{\langle Hz\rangle}{\langle CPB\rangle\langle IOsize\rangle} \quad (12)$$

Substituting the numerical values into Equation 12, the following are obtained:

| | |
|---|---|
| Parallel fraction - 8 KB CM Writes | 0.991 |
| CPB | 65.50 |
| Core Count | 100 |
| Core clock frequency (GHz) | 5.0 |
| Single Core IOPS | 9,318 |
| Speedup | 54.02 |
| Multi-core IOPS | 503,378 |

Figure 6:
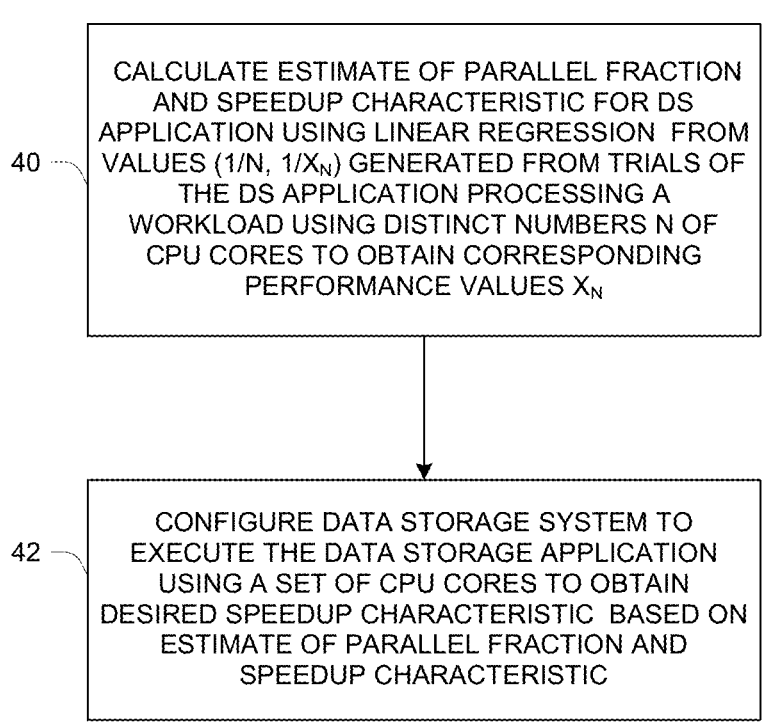
FIG. 6 is a flow diagram of operation.

FIG. 6 is a simplified flow diagram of operation as described herein, namely, a method of tuning performance of a data storage system based an a quantified understanding of scalability as described above. At 40, an estimate is calculated of parallel fraction and speedup characteristic for a data storage application executed by the data storage system. The estimate is calculated using linear regression of values (1/N, 1/$X_N$) generated from trial runs of the data storage application processing a workload using respective distinct numbers N of CPU cores, to obtain corresponding performance values $X_N$. As noted above, in one embodiment the performance metric is IOPS, but in other applications other performance metrics may be used. The trials may be run on the data storage system that is being tuned, or they may be run separately such as in a separate performance analyzer as described above. Also, the data collection and calculations may be done at a time removed from the time of operation of the data storage system, even as early as a design stage for example.

At 42, the data storage system is configured to execute the data storage application using a number of CPU cores based on the estimate of parallel fraction and speedup characteristic. This configuring can take a couple of forms, depending on the usage. The parallel fraction and speedup characteristic are features of the data storage application, specifically its parallelizability, and thus in one usage the estimated values can be used to determine whether the application meets performance objectives (e.g., whether it will be able to provide a target IOPS using a given N-core CPU) and to quantify performance improvements arising from modifying the application code. Thus a developer might use the technique in connection with modifying the code to increase parallel fraction, as measured by using the disclosed technique. Once a desired parallel fraction has been reached, the modified code can be deployed to the data storage system(s) with confidence of meeting performance objectives. In another usage, the analysis results can be used to inform decisions about sizing of processing resources (i.e., numbers of cores) when designing a system, or in an existing system to assess how to best utilize available cores (e.g., to achieve a desired performance-versus-efficiency tradeoff, or to balance performance of one application against that of another). These and other uses may employ criteria such as a low-return zone (FIG. 4) for a threshold of efficiency, e.g., by only deploying up to the critical number of cores and thereby avoid relatively inefficient use of additional cores. Other types of configuration activities are of course possible.

CONCLUSION

The method described above provides a fast and accurate way to determine parallel fraction and single-core cycles per byte from system performance measurements. The results provide quantitative measures for tracking progress in system performance tuning as well as parameters for system performance modeling. In one use, the values of parallel fraction and single core cycles per byte over time to evaluate progress in performance tuning.

More specifically, the disclosed method avoids certain potential inefficiency and inaccuracy of other techniques. By using reciprocal values (1/N, $1/X_N$), Amdahl's law is converted into a linear relationship. Advantages of this technique include:

1) Ability to use linear least squares fitting procedure to derive parallel fraction (no guesswork, no trial and error involved)
2) Unnecessary to measure every possible core count (N, $X_N$) pair to calculate parallel fraction; a relatively small subset suffices to obtain acceptable accuracy
3) The parallel fraction calculation process can be automated to save engineering resources and avoid human errors While various embodiments of the invention have been particularly shown and described, it will be understood by those skilled in the art that various changes in form and details may be made therein without departing from the spirit and scope of the invention as defined by the appended claims.

What is claimed is:

1. A method of tuning performance of a data storage system, comprising:
    calculating an estimate of parallel fraction and speedup characteristic for a data storage application executed by the data storage system, the estimate being calculated using linear regression of values (1/N, $1/X_N$) generated from trial runs of the data storage application processing a workload using respective distinct numbers N of CPU cores to obtain corresponding performance values $X_N$; and
    configuring the data storage system to execute the data storage application using a number of CPU cores based on the estimate of parallel fraction and speedup characteristic;
    the data storage system subsequently executing the data storage application using the number of CPU cores.

2. The method of claim 1, further including executing the trial runs of the data storage application processing the workload using the respective distinct numbers N of CPU cores to obtain the corresponding performance values $X_N$.

3. The method of claim 2, wherein the trial runs are executed in a performance analyzer system separate from the data storage system.

4. The method of claim 1, further including modifying the data storage application to improve the parallel fraction and speedup characteristic, and wherein configuring the data storage system includes deploying the data storage application as modified to the data storage system for execution thereon.

5. The method of claim 1, wherein the calculating is based on an expression relating speedup to an inverse of a parallel fraction for the data storage application, the parallel fraction being a fraction of the data storage application that can be executed in parallel.

6. The method of claim 5, wherein the calculating is further based on an inversion of the expression that yields a linear expression for $1/X_N$ in terms of 1/N, the linear expression having slope and intercept values identified by the linear regression and used in substitution calculations to obtain the parallel fraction and a single-core performance value.

7. The method of claim 6, wherein the substitution calculations include (1) calculating the single-core performance value as 1/(m+b), m being the slope value and b being the intercept value, and (2) calculating the parallel fraction as m/(m+b).

8. The method of claim 1, wherein the configuring is further based on being outside of a defined low return zone in which incremental speedup with additional cores is below an acceptable threshold.

9. The method of claim 8, wherein the acceptable threshold is a predetermined fraction of N.

10. The method of claim 1, wherein the performance values are values of input/output operations per second (IOPS) as a performance metric for the data storage application.

11. The method of claim 1, wherein the performance values $X_N$ are scaled values calculated by normalizing raw performance values with respect to CPU utilization achieved during the respective trials.

12. A computer system having a performance analysis system coupled to a data storage system, the performance analysis system being a computerized device configured and operative to execute computer program instructions to tune performance of the data storage system by:
    calculating an estimate of parallel fraction and speedup characteristic for a data storage application executed by the data storage system, the estimate being calculated using linear regression of values (1/N, $1/X_N$) generated from trial runs of the data storage application processing a workload using respective distinct numbers N of CPU cores to obtain corresponding performance values $X_N$; and configuring the data storage system to execute the data storage application using a number of CPU cores based on the estimate of parallel fraction and speedup characteristic;

the data storage system subsequently executing the data storage application using the number of CPU cores.

13. The computer system of claim 11, wherein the performance-tuning further includes executing the trial runs of the data storage application processing the workload using the respective distinct numbers N of CPU cores to obtain the corresponding performance values $X_N$.

14. The computer system of claim 13, wherein the trial runs are executed in the performance analysis system.

15. The computer system of claim 11, wherein the performance-tuning further includes modifying the data storage application to improve the parallel fraction and speedup characteristic, and wherein configuring the data storage system includes deploying the data storage application as modified to the data storage system for execution thereon.

16. The computer system of claim 11, wherein the calculating is based on an expression relating speedup to an inverse of a parallel fraction for the data storage application, the parallel fraction being a fraction of the data storage application that can be executed in parallel.

17. The computer system of claim 16, wherein the calculating is further based on an inversion of the expression that yields a linear expression for $1/X_N$ in terms of $1/N$, the linear expression having slope and intercept values identified by the linear regression and used in substitution calculations to obtain the parallel fraction and a single-core performance value.

18. The computer system of claim 11, wherein the configuring is further based on being outside of a defined low return zone in which incremental speedup with additional cores is below an acceptable threshold.

19. The computer system of claim 18, wherein the acceptable threshold is a predetermined fraction of N.

20. The computer system of claim 11, wherein the performance values are values of input/output operations per second (IOPS) as a performance metric for the data storage application.

21. The computer system of claim 11, wherein the performance values $X_N$ are scaled values calculated by normalizing raw performance values with respect to CPU utilization achieved during the respective trials.

* * * * *